G. C. YOUNGGREEN & J. C. LOEF.
BLOW-OUT GUARD FOR INNER TUBES.
APPLICATION FILED OCT. 26, 1909.
972,976.
Patented Oct. 18, 1910.
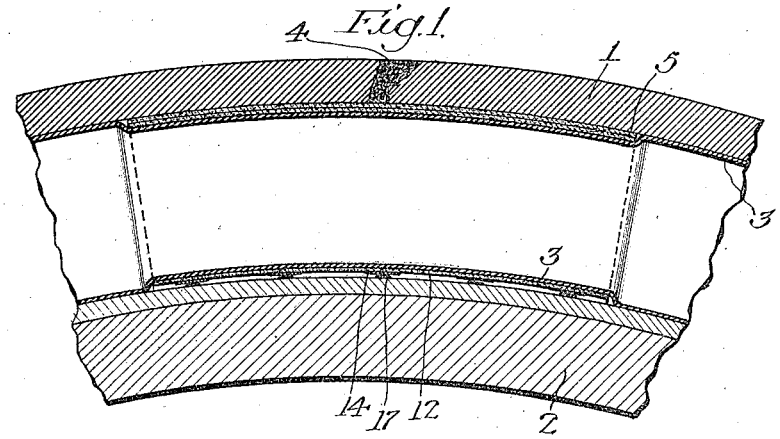
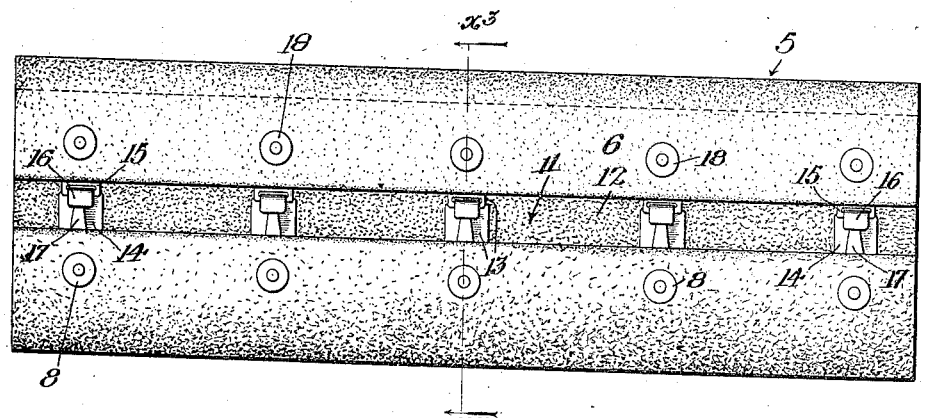

UNITED STATES PATENT OFFICE.

GROVER C. YOUNGGREEN AND JOHN C. LOEF, OF LOS ANGELES, CALIFORNIA.

BLOW-OUT GUARD FOR INNER TUBES.

972,976.  Specification of Letters Patent.  Patented Oct. 18, 1910.

Application filed October 26, 1909. Serial No. 524,709.

*To all whom it may concern:*

Be it known that we, GROVER C. YOUNG-GREEN, a citizen of the United States, and JOHN C. LOEF, a Swedish subject, both residing at Los Angeles, in the county of Los Angeles and State of California, have invented a new and useful Blow-Out Guard for Inner Tubes, of which the following is a specification.
This invention relates to a device which is adapted to be inserted inside the casing of a pneumatic tire for preventing the inner tube from blowing out through a hole or weak place in the outer casing, and the main object of the invention is to provide such means which can be quickly applied within the tire to securely hold the inner tube from enlarging at the weak point in the outer casing and being blown therethrough by the air pressure from within.

A further object is to construct such device of inexpensive materials.

A further object is to provide means for quickly securing the edges of the guard together to positively hold the guard to a fixed size and thus retain the inner tube.

As the device is so constructed that when fastened in place in the tire its size is fixed, it is contemplated supplying these devices in various sizes, so that they may be readily applied to the particular size of tire for which it is made.

Referring to the drawings:—Figure 1 is a vertical longitudinal section through a portion of a tire having a weak place in its outer casing, and the blowout guard being applied to the tire. Fig. 2 is a plan view of the inner face of the blowout guard. Fig. 3 is a section on line $x^3$—$x^3$ Fig. 2. Fig. 4 is a perspective view of the clasp.

1 designates the outer casing of the tire.
2 designates the rim of the wheel.
3 is the inner tube.

The outer casing 1 is shown as having a weak spot 4 which under ordinary circumstances would allow the inner tube to be forced therethrough by the air pressure within the inner tube. To prevent this the blowout guard is arranged around the inner tube inside of the casing and extends for a considerable distance in each direction from the weak spot 4. The blow-out guard comprises a cylindrical sleeve 5 formed of canvas or other suitable material preferably in two layers as indicated in Fig. 3. The outer layer 6 is doubled back on itself for a short distance as at 7 and secured by rivets 8. The outer layer 6 on the opposite side is doubled back on itself as at 9 to form an inner layer 10 which forms a gap 11 between the two edges, and the inner layer 10 is extended around inside the outer layer 6 as far as the folded portion 7, at which point it passes over the folded portion 7 and extends across the gap 11, thus forming a flap 12 which laps over the other side of the guard so as to prevent the inner tube from being forced into the gap 11.

The two edges of the guard are secured together by fasteners which comprise hook members 14 and eye members 15. The hook members 14 are secured by the rivets 8 and are formed of sheet-metal with a hook 16 and a spring tongue 17, the free end of which lies underneath the edge of the hook 16. The eye members 15 are secured to rivets 18. The hooks 16 are adapted to engage the eyes 15 as indicated in Figs. 2, 3 and 4, and when so engaged the spring tongues 17 prevent the eyes from disengaging from the hooks, and the flap 12 covers the rivets 8 and 18 and hooks 14 and 15 and thus prevents the inner tube 3 from coming in contact with these parts or being forced between the edges of the guard.

The guard is placed around the inner tube, as indicated in Fig. 1, and when secured by the clasps 13 forms a nonstretchable cylinder which serves as a jacket confining the inner tube for a certain distance and positively preventing the inner tube from being forced out by the air pressure through the weak place or hole in the tire. The device being of canvas can be readily folded flat and thus occupies little room.

We do not limit ourselves to using canvas as the material of which the device is constructed, as any other material which is sufficiently flexible and nonstretchable could be employed in lieu thereof.

What we claim is:—

A blow out guard for inner tubes comprising a jacket of non-stretchable thin material for insertion within the outer casing and around the inner tube, the material of said jacket being folded on itself and extending double substantially laterally around the inner tube, the inner layer of one side being extended beyond the fold to form a flap, and snap fasteners secured by rivets to the opposite folds outside said flap.

In testimony whereof, we have hereunto set our hands at Los Angeles, California, this 20th day of October 1909.

GROVER C. YOUNGGREEN.
JOHN C. LOEF.

In presence of—
G. T. HACKLEY,
P. H. SHELTON.